United States Patent [19]
Lauro et al.

[11] Patent Number: 5,473,330
[45] Date of Patent: Dec. 5, 1995

[54] TAGGING SYSTEM HAVING RESONANT FREQUENCY SHIFT COMPENSATION

[75] Inventors: George L. Lauro, Lake Zurich; Sanjar Ghaem, Palatine; Rudyard L. Istvan, Winnetka, all of Ill.

[73] Assignee: Motorola, Inc., Schaumburg, Ill.

[21] Appl. No.: 153,450

[22] Filed: Nov. 17, 1993

[51] Int. Cl.⁶ .................................................. G01S 13/80
[52] U.S. Cl. ............................................. 342/42; 342/51
[58] Field of Search ........................................ 342/42, 51

[56] References Cited

U.S. PATENT DOCUMENTS

| | | |
|---|---|---|
| 4,023,167 | 5/1977 | Wahlstrom. |
| 5,204,681 | 4/1993 | Greene ........................................ 342/51 |
| 5,287,112 | 2/1994 | Schuermann ............................ 342/42 |

FOREIGN PATENT DOCUMENTS

2246492  1/1992  United Kingdom.

Primary Examiner—Mark Hellner
Attorney, Agent, or Firm—Phillip H. Melamed

[57] ABSTRACT

A tagging system (20) compensates for both resonant frequency spatial dependent shifts and resonant frequency dependent shifts for detecting data resonant circuits (DC1–DC6) on an RF tag 10 which is carried by a tagged object (34). The system includes at least one transmitter (26) and at least one receiver (28) for determining the actual resonant frequencies of reference resonant circuits (SC1–SC5, FC1–FC4) on the tag 10. A microprocessor controller (22), in response to the frequency difference between the undisturbed resonant frequencies of the reference resonant circuits and the actual resonant frequencies of the reference resonant circuits, provides compensating factors to compensate for the spatial and frequency effects of the resonant frequencies of the resonant circuits on the tag (10). The transmitter and receiver determine the actual resonant frequency of each data resonant circuit (DC1–DC6) on the tag (10). The microprocessor controller (22) then determines the undisturbed resonant frequencies of the data resonant circuits on tag (10) from the actual resonant frequencies of the data resonant circuits and the compensation factors.

38 Claims, 4 Drawing Sheets

FIG.9

TAGGING SYSTEM HAVING RESONANT FREQUENCY SHIFT COMPENSATION

FIELD OF INVENTION

The present invention generally relates to the field of tagging systems in which the presence of resonant circuits or other resonant modes on a tag are detected to generate a code determined in accordance with which resident circuits or other resonant modes are being detected. More particularly, the present invention relates to an improved RF tagging system which compensates for frequency shifts of the resonant frequencies of the resonant circuits or modes due to the interaction of the tagged item with the resonant circuits or modes on the RF tags or due to other disturbances or manufacturing variations. More specifically, the present invention relates to such an improved system which compensates for spatial and/or frequency dependent resonant frequency shifts in the resonant frequencies of the resonant circuits due to interaction between the tagged item and the resonant circuits on the tag.

BACKGROUND OF THE INVENTION

Prior art systems are known in which the existence of a single resonant circuit in a detection field or zone is utilized as an anti-theft type apparatus. Essentially, if an article having a single resonant frequency tag passes through a detection zone, an alarm is generated which indicates the unauthorized presence of store goods in the detection zone. Such resonant circuits have been constructed in accordance with standard printed circuit board techniques.

Some prior RF tagging systems have provided multiple different tuned (resonant) circuits on a tag so as to specifically identify the goods to which the tag is attached or the destination to which those goods should be directed. Such systems have been proposed for parcel or other article delivery systems wherein resonant circuits are utilized to provide a destination or sender code rather than printed bar codes.

The use of resonant circuit tagging is advantageous in that it is not subject to problems such as dirt obscuring a portion of a printed bar code and causing an error in determining the code associated with the article. Also, exact alignment of the tag with the detection system may not be required in RF tagging systems, since generally it is desired only to detect the presence of the resonant circuits somewhere in a broad detection zone. This can be achieved without precise alignment between the resonant circuit, the detection zone and the detection apparatus. However, prior systems utilizing multiple tuned circuit detection contemplate sequentially generating or gating each of the different resonant frequency signals to a transmitter antenna, and then waiting for reflected energy from each of the tuned circuits to be detected. Some frequency tagging systems look for absorption of RF energy by a resonant circuit during the transmission of each test frequency signal.

Generally, each different resonant frequency in a multiple frequency system is provided by a master oscillator circuit or transmitter whose output is essentially swept or stepped to sequentially provide each desired output frequency. In all of these systems the result is essentially a slow detection system since the systems sequentially radiate each of the different frequencies. Rapid detection is achieved only if there are a few different frequencies involved.

Some prior RF tagging systems contemplate printing a large number of different resonant frequency circuits on a tag and then creating different codes by the selective adjustment of some of these resonant circuits. These systems have recognized that it may be necessary to adjust the resonant frequency provided for each circuit and such adjustment is generally contemplated as occurring by selective removal of metalization forming the resonant circuit. Some systems have recognized that step adjustments of the resonant frequency of such tuned circuits is desirable and this has been implemented by punching holes of predetermined diameters in capacitive elements of the resonant circuit to thereby reduce capacitance and increase the frequency of the resonant circuit. Such known prior techniques are not readily adaptable to mass production of customized resonant frequency codes by a post factory manufacturing operation. Many times, the actual code to be utilized will not be known until immediately prior to attaching a tag or label to an article.

When it is possible to accurately control the orientation between the resonant multiple frequency tag and the detection zone, some prior systems have noted that fewer different resonant frequencies may be needed to produce the desired end coding result. However, these prior systems accomplish this result by just limiting the number of circuits in the detection zone so that the zone can only accommodate a few different tuned circuits at one time. This has the undesirable effect of effectively requiring wide spacing between tuned circuits on a tag and therefore undesirably increasing the size of the tag on which the tuned circuits are provided.

An improved RF tagging system is fully described in copending application Ser. No. 07/966,653, filed on Oct. 26, 1992, in the names of Sanjar Ghaem, Rudyard L. Istvan, and George L. Lauro, for RF Tagging System and RF Tags and Method, which application is assigned to the assignee of the present invention and fully incorporated herein by reference. The system there disclosed includes, as a significant feature, the simultaneous radiation of RF energy at a plurality of different frequencies in order to detect each of a plurality of different frequency resonant circuits which may be provided on a tag. Then a code signal indicative of which resonant frequencies for the tag resonant circuits were detected is provided. The above feature results in a much faster detection of which resonant frequency circuits are provided on a tag in a detection zone. The cross-referenced application further describes an advantageous configuration for step frequency adjusting the resonant frequencies of resonant circuits on a tag and additionally, an RF tagging system which utilizes focused narrow radiation beams for detection of individual resonant circuits on a multiple resonant frequency tag. Also, disclosed are preferred RF tag configurations/ constructions and a method of making such tags. Additionally, the aforementioned cross-referenced application describes RF tagging system features related to the use of phase shifting/polarization, object approach detection and measuring both voltage and current signals so as to provide improved RF tag detection systems.

In accordance with the present invention, it has been recognized that shifts in the resonant frequencies of multiple tuned resonant circuits can be caused by RF properties of the tagged items to which the resonant frequency circuits are in close proximity. The shifts in the resonant frequencies of the resonant circuits results from contents in the tagged items interacting with the resonant circuits on the RF tag. The magnitude in which resonant frequencies are shifted is a function of two mutually independent parameters: (1) frequency dependent distortions or shifts; and/or (2) spatially dependent distortions or shifts. In the case of frequency dependent distortions or shifts, the RF characteristics of the tagged item will vary with frequency. Interaction between the tagged item and the resonant frequency circuits on the tag will be more pronounced at certain frequencies than others. In the case of spatially dependent distortions or shifts, the proximity of the resonant frequency circuits to the RF disturbing elements in the tagged item effect the degree of the frequency shifts. Some resonant circuits will be closer to disturbing elements in the item than others and will thus experience more pronounced frequency shifts than other resonant circuits which are more distant from the RF disturbing elements in the tagged item.

The present invention provides an improved tagging system having resonant frequency shift compensation. In accordance with the present invention, the frequency dependent and/or spatial dependent components of the resonant frequency shifts are detected by determining the actual resonant frequencies of reference resonant circuits on a tag. Thereafter, the difference between the actual resonant frequencies of the reference resonant circuits and the undisturbed resonant frequencies of the reference resonant circuits is determined for each reference resonant circuit and compensation factors are provided for each data resonant circuit. Responsive to the compensation factors, the resonant frequency detector determines the resonant frequencies of the data resonant circuits for generating a code indicative of which data resonant circuits are on the tag. Hence, in accordance with the present invention, two sets of reference resonant circuits may be used. A first set of reference resonant circuits may be used for detecting spatially dependent resonant frequency shifts and a second set of reference resonant circuits may be used for detecting the frequency dependent resonant frequency shifts. The present invention has aspects applicable to manufacturing variation compensation and compensation for other disturbances such as temperature, mechanical deformation or other objects, besides the tagged object, which alter a designed resonant mode on a tag.

SUMMARY OF THE INVENTION

The present invention provides an improved tagging system with resonance compensation.

The present invention provides an RF tagging system including a tag having thereon a plurality of reference resonant means and a plurality of data resonant means, each of the data resonant means being resonant at a different actual resonant frequency corresponding to an undisturbed resonant frequency selected from a predetermined plurality of known resonant frequencies and each reference resonant means being resonant at an actual different resonant frequency corresponding to a predetermined known undisturbed different resonant frequency, determining means for determining the actual resonant frequencies of each reference resonant means, and compensating means for determining for each reference resonant means the frequency difference between its actual resonant frequency and its corresponding predetermined known undisturbed resonant frequency and responsive thereto providing a compensation factor for the resonant frequency of each data resonant means. The determining means determine the actual resonant frequency of each data resonant means and the compensating means are responsive to the compensation factors and the actual resonant frequencies of the data resonant means for determining the undisturbed resonant frequencies of the data resonant means.

The present invention provides an RF tagging system including a tag having thereon a plurality of reference resonant circuits and a plurality of data resonant circuits. Each of the data resonant circuits is resonant at a different actual resonant frequency corresponding to an undisturbed resonant frequency selected from a predetermined plurality of known resonant frequencies and each of the reference resonant circuits is resonant at an actual different resonant frequency corresponding to a predetermined known undisturbed different resonant frequency. The system further includes determining means for determining the actual resonant frequency of each reference resonant circuit and compensating means for determining, for each reference resonant circuit, the frequency difference between its actual resonant frequency and its corresponding predetermined known undisturbed resonant frequency and responsive thereto for providing a compensation factor for the resonant frequency of each data resonant circuit. The determining means determine the actual resonant frequency of each data resonant circuit and the compensating means are responsive to the compensation factors and the actual resonant frequencies of the data resonant circuits for determining the undisturbed resonant frequencies of the data resonant circuits.

The invention further provides an RF tagging system which includes a tag having thereon a plurality of first reference resonant circuits, a plurality of second reference resonant circuits, and a plurality of data resonant circuits. Each data resonant circuit is resonant at a different actual resonant frequency corresponding to an undisturbed resonant frequency selected from a predetermined plurality of known resonant frequencies and being located at a predetermined known location on the tag. Each first reference resonant circuit is resonant at an actual different resonant frequency corresponding to a predetermined known undisturbed different resonant frequency and is located at a predetermined known location on the tag. Each second reference resonant circuit is resonant at an actual different resonant frequency corresponding to a predetermined known undisturbed different resonant frequency and is located at a predetermined known location on the tag. The system further includes determining means for determining the actual resonant frequency of each reference resonant circuit and compensating means for determining, for each first reference resonant circuit, the frequency difference between its actual resonant frequency and its corresponding predetermined known undisturbed resonant frequency, for determining, for each second reference resonant circuit the frequency difference between its actual resonant frequency and its corresponding predetermined known undisturbed resonant frequency, and being responsive to the determined frequency differences for providing a compensation factor for the resonant frequency of each data resonant circuit. The determining means determine the actual resonant frequency of each data resonant circuit and the compensating means are responsive to the compensation factors and the actual resonant frequencies of the data resonant circuits for determining the undisturbed resonant frequencies of the data resonant circuits. The present invention has aspects applicable to manufacturing variation compensation and compensation for other disturbances such as temperature, mechanical deformation or other objects, besides the tagged object, which alter a designed resonant mode on a tag.

DESCRIPTION OF THE PREFERRED EMBODIMENTS

Figures 1, 2:
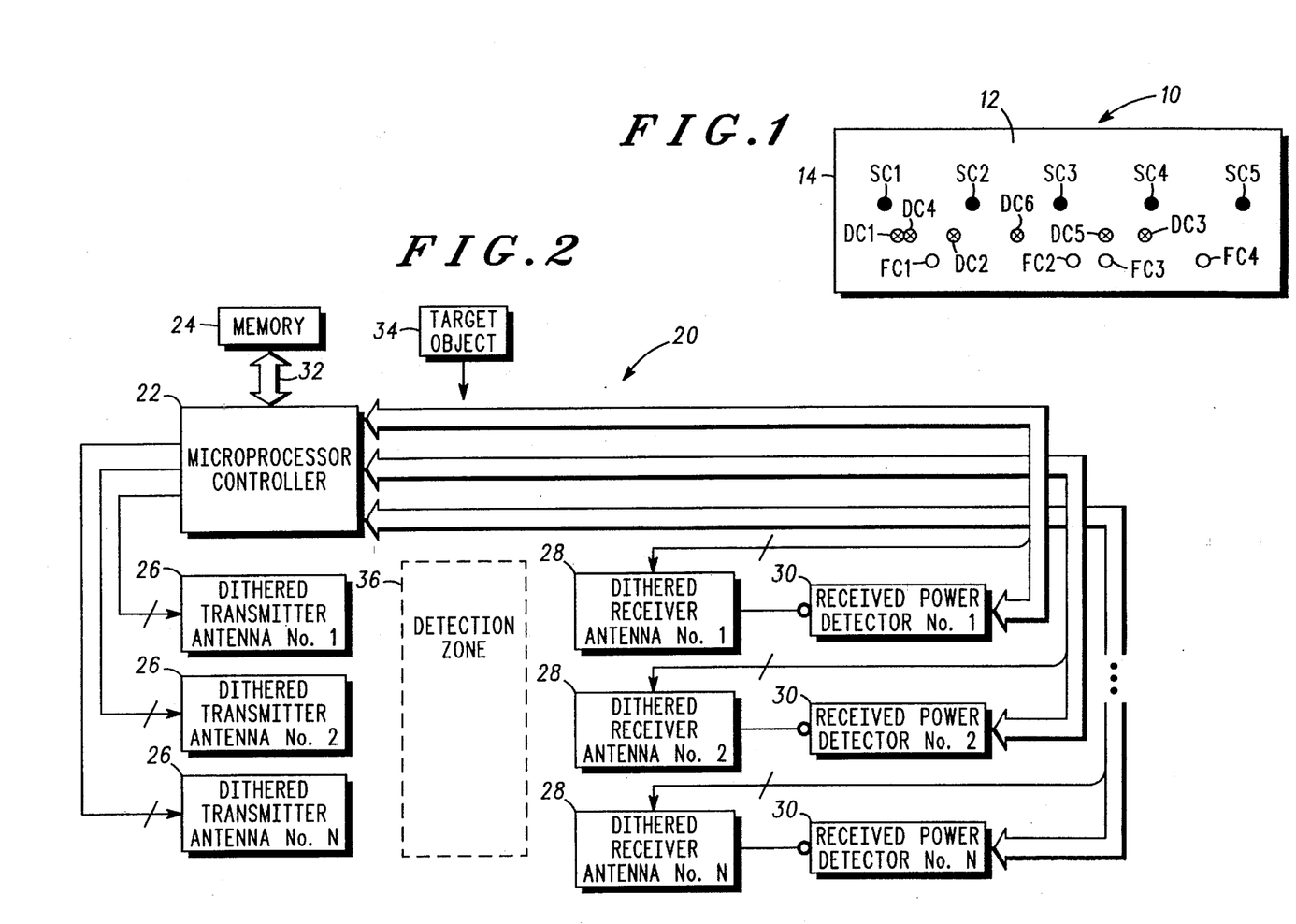
FIG. 1 is a top plan view of an RF tag embodying the present invention which includes a plurality of data resonant circuits, a plurality of spatial reference resonant circuits, and a plurality of frequency reference resonant circuits.
FIG. 2 is a schematic diagram of an RF tagging system constructed in accordance with the present invention.

Referring now to FIG. 1, it illustrates, in top plan view, an RF tag 10 which embodies the present invention and which may be utilized to advantage in practicing the present invention. The RF tag 10 includes a substantially planar surface 12 having formed thereon a plurality of data resonant circuits DC1, DC2, DC3, DC4, DC5, and DC6, a plurality of first reference resonant circuits SC1, SC2, SC3, SC4, and SC5 and a plurality of second reference resonant circuits FC1, FC2, FC3, and FC4.

Each data resonant circuit DC1–DC6 has an undisturbed resonant frequency selected from a predetermined plurality of known resonant frequencies and are located at predetermined known locations on the tag with reference to the left side marginal edge 14 of the tag 10. When the tag 10 is placed on or otherwise associated with an item to be tagged, the item may include RF disturbing elements which interact with the data resonant circuits DC1–DC6 to cause each data resonant circuit to resonate at a different actual or disturbed resonant frequency corresponding to it associated undisturbed resonant frequency. The difference between the undisturbed resonant frequency and the actual or disturbed resonant frequency of each data resonant circuit is referred to herein as the resonant frequency shift of each data resonant circuit. The resonant frequency shift, as contemplated by the present invention, is a function of two mutually independent parameters or components: (1) a spatially dependent component and/or (2) a frequency dependent component. A spatially dependent component relates to the proximity of each data resonant circuit to the RF disturbing elements in the tagged item. Some data resonant circuits will be closer to disturbing elements in the item and thus will experience a more pronounced resonant frequency shift than other, more distant data resonant circuits. The frequency dependent component relates to the RF characteristics of the tagged item and will vary with frequency. Interaction between the tagged item and the data resonant circuits on the tag will be more pronounced at certain frequencies than others.

By selecting different combinations of the data resonant circuits for the tag 10, the tag 10 can have a code which specifically identifies either the identity of the tagged object or identifies other information such as the address to which the tagged object should be directed or the address from which the tagged object has been sent. Because the resonant frequencies of the data resonant circuits will be shifted due to the interaction of the tagged item with the data resonant circuits, it is desirable to be able to estimate the amount of frequency shift for each possible resonant circuit, detect the actual or disturbed resonant frequency of each data resonant circuit, and then correlate the actual or disturbed resonant frequencies of the data resonant circuits with the undisturbed resonant frequencies of the data resonant circuits to identify which of the predetermined plurality of data resonant circuits reside on the tag 10 to facilitate the determination of the specific code of the tag 10. The present invention provides a system for achieving this end which estimates the resonant frequency shift for each of the possible data resonant circuits, which detects the actual or disturbed resonant frequencies of the data resonant circuits, and thereafter correlates the actual or disturbed resonant frequencies to the predetermined known undisturbed resonant frequencies for determining the specific code of the tag.

To this end, each first reference resonant circuit SC1–SC5 comprise spatial reference resonant circuits with each one being resonant at a predetermined known undisturbed different resonant frequency and being located at a predetermined known location on the tag 10 with reference to the margin 14. When the tag 10 is placed in close proximity to the tagged item, each of the spatial reference resonant circuits SC1–SC5 will thereby be resonant at a different actual or disturbed resonant frequency corresponding to a predetermined known undisturbed resonant frequency. The spatial reference resonant circuits SC1–SC5 have undisturbed frequencies that are very close to each other and preferably at the minimum frequency separation that may be discerned by a detection system such as that illustrated in FIG. 2 and which will be described subsequently. In accordance with this preferred embodiment, the undisturbed resonant frequencies of the spatial reference resonant circuits SC1–SC5 are separated in frequency by 2 KHz. For example, resonant circuit SC1 may have an undisturbed resonant frequency of 500 KHz, spatial reference resonant circuit SC2 may have an undisturbed resonant frequency of 502 KHz, spatial reference resonant circuit SC3 may have an undisturbed resonant frequency of 504 KHz, spatial reference resonant circuit SC4 may have a resonant frequency of 506 KHz, and spatial reference resonant circuit SC5 may have an undisturbed resonant frequency of 508 KHz. Because the undisturbed resonant frequencies of the spatial reference resonant circuits SC1–SC5 are closely spaced together, they may be utilized for estimating the spatial component in the resonant frequency shifts and thereby the resonant frequency shifts of the spatial reference resonant circuits SC1–SC5 will not be dependent upon a frequency shift component.

The second reference resonant circuits FC1–FC4 comprise frequency reference resonant circuits with each being resonant at a predetermined known undisturbed different resonant frequency and being located at a predetermined known location on the tag 10 with reference to the margin 14. Like the other resonant circuits, the frequency reference resonant circuits will experience a resonant frequency shift when placed in proximity to the tagged item so that each will be resonant at an actual or disturbed different resonant frequency corresponding to a predetermined known undisturbed resonant frequency. The frequency resonant reference circuits are preferably resonant at frequencies which are widely spaced apart and which collectively span the entire band of frequencies in which the data resonant circuits are resonant. For example, and in accordance with this preferred embodiment, the undisturbed resonant frequencies of the data reference circuits span a frequency range between 150 KHz and 500 KHz and the undisturbed resonant frequencies of the frequency reference resonant circuits span a band of frequencies from, for example, 75 KHz to 600 KHz. More specifically, and in accordance with this preferred embodiment, the frequency reference resonant circuit FC1 may have an undisturbed resonant frequency of 75 KHz, the frequency reference resonant circuit FC2 may have an undisturbed resonant frequency of 200 KHz, the frequency reference resonant circuit FC3 may have a resonant frequency of 400 KHz, and the frequency reference resonant circuit FC4 may have an undisturbed resonant frequency of 600 KHz.

The resonant circuits contained on the tag 10 are preferably passive resonant circuits and may be formed by using prior art printing techniques. However, those skilled in the art will appreciate that the present invention also applies to other types of resonant arrays as, for example, acoustic arrays. Included in such other types of resonant arrays are also magnetic resonant devices, such as PMR (programmable magnetic resonance) devices, in which one or more mechanically resonant modes are provided by one or more mechanically resonant devices in response to applied magnetic fields. Note that one PMR device can resonant at one or more than one resonant modes. Such PMR devices are described in PCT patent application publication WO 92/12402, published Jul. 23, 1992. Preferably, the resonant circuits on the tag 10 are formed in a manner fully described in the aforementioned copending cross-referenced application which is incorporated herein by reference.

Referring now to FIG. 2, it illustrates in schematic diagram form, an RF tagging system 20 constructed in accordance with the present invention. The system 20 generally includes a microprocessor controller 22, a memory 24, a plurality of dithered or variable frequency transmitters 26, a like plurality of dithered or variable frequency receivers 28 and a like plurality of received power detectors 30.

The microprocessor controller 22 controls the overall operation of the system 20. The microprocessor controller 22 is coupled to the memory 24 by a bidirectional bus 32 for receiving operating instructions from the memory 24 and required data to permit the microprocessor controller 22 to generate compensation factors for determining the resonant frequency shifts of the resonant circuits contained on a target object 34 which carries an RF tag such as the RF tag 10 of FIG. 1. As will be seen hereinafter, the memory 24 is provided with the undisturbed resonant frequencies of each of the resonant circuits on tag 10 and the location of each resonant circuit on tag 10 with reference to the side margin 14.

The microprocessor controller 22 is also coupled to the dithered transmitters 26 which are numbered 1–n. In accordance with this preferred embodiment, there is a dithered transmitter 26 provided for each resonant circuit which may reside on the tag 10. As will be seen hereinafter, each of the dithered transmitters 26 radiate radio frequency energy in a frequency range which sweeps above and below a center frequency with each center frequency corresponding to the estimated actual resonant frequencies of the resonant circuits. The center frequencies and the frequency range swept by each dithered transmitter 26 is controlled by the microprocessor controller 22.

Similarly, each of the dithered receivers 26 are numbered from 1–n and are coupled to the microprocessor controller 22. Each of the dithered receivers 28, under control of the microprocessor controller 22, receives radio frequency energy in the frequency range of the radio frequency energy transmitted by its correspondingly numbered dithered transmitter. The receive center frequencies and the receive sweep range of each dithered receiver 28 is controlled by the microprocessor controller 22.

The received power detectors 30 are similarly numbered 1–n and provide for the detection of received power from its corresponding dithered receiver 28. The received power detectors 30 are also coupled to the microprocessor controller 22 for providing the microprocessor controller 22 with received power data. This permits the microprocessor controller 22 to determine which resonant circuits are contained on the tag 10.

The dithered transmitters 26 and dithered receivers 28 define a detection zone 36 which the target object 34 enters when the code on the tag 10 is to be identified. The presence of the target object 34 within the detection zone 36 may be detected in a manner as disclosed in the aforementioned copending cross-referenced application.

The presence of a resonant circuit within the detection zone 36 may be detected in a number of different ways in accordance with the present invention. For example, the presence of a resonant circuit may be detected by the amount of loading that the resonant circuit places on its corresponding dithered transmitter 26. This manner of detection is a form of grid dip detection which is fully described in the aforementioned cross-referenced application.

The presence of a resonant circuit within the detection zone 36 may also be detected by detecting the ringing of a resonant circuit immediately after its corresponding dithered transmitter 26 is turned off. The ringing radio frequency energy emitted from the resonant circuit may be detected by its corresponding dithered receiver 28 and the power of the received energy may then be detected by the corresponding received power detector 30. The corresponding received power detector 30 then conveys information to the microprocessor controller 22 indicating that a ringing signal was received from the corresponding resonant circuit. This method of detection is also fully disclosed in the aforementioned cross-referenced application.

The presence of a resonant circuit within the detection zone 36 may further be detected in accordance with the present invention by detecting absorption of the radiated radio frequency energy provided by its corresponding dithered transmitter 26. As the dithered transmitter 26 transmits, the corresponding dithered receiver receives radio frequency energy which, in the presence of the corresponding resonant circuit within detection zone 36, will be of less power than transmitted by the corresponding dithered transmitter 26. The corresponding received power detector 30 then conveys the received power to the microprocessor controller 22 which then determines if there has been power absorption of the radio frequency energy radiated by the corresponding dithered transmitter 26. This method of detection is also fully disclosed in the aforementioned cross-referenced application.

Prior to the target object 34 entering the detection zone 36, the memory 24 is provided with data including the undisturbed resonant frequencies of the reference resonant circuits, the locations of the reference resonant circuits, the undisturbed resonant frequencies of all potential data resonant circuits which may reside on the tag 10, and the locations of the data resonant circuits which may reside on the tag 10. When the target object 34 carrying the tag 10 enters the detection zone 36, the dithered transmitters 26, the dithered receivers 28, and the received power detectors 30 first determine the actual or disturbed resonant frequencies of the spatial reference resonant circuits SC1–SC5 and the actual or disturbed resonant frequencies of the frequency reference resonant circuits FC1–FC4. This is accomplished by the dithered transmitters 26 corresponding to the reference resonant circuits radiating electrical energy above and below the known resonant frequencies of the reference resonant circuits and in frequency ranges which will assure detection of the actual or disturbed resonant frequencies of all of the reference resonant circuits. For example, the dithered transmitters 26 may be conditioned for sweeping a frequency range of plus or minus 25% of the undisturbed resonant frequencies of the reference resonant circuits.

In a similar manner, the corresponding dithered receivers 28 are conditioned for receiving electrical energy in the frequency ranges corresponding to their corresponding dithered transmitters. The corresponding received power detectors 30 are then utilized to permit the microprocessor controller 32 to determine, from the degree of power absorption resulting from the presence of each reference resonant circuit in zone 36, the actual or disturbed resonant frequency of each reference resonant circuit.

When the microprocessor controller 22 determines the actual resonant frequencies of all of the reference resonant circuits, it constructs a table which includes the information illustrated in Table 1 below.

| REFERENCE CELL | UNDISTURBED FREQUENCY KHZ | MEASURED FREQUENCY SHIFT % | LOCATION ON TAG |
|---|---|---|---|
| SC1 | 500 | +4 | 2 CM |
| SC2 | 502 | +20 | 9 CM |
| SC3 | 504 | −4 | 15 CM |
| SC4 | 506 | +20 | 20 CM |
| SC5 | 508 | +16 | 26 CM |
| FC1 | 75 | −16 | 5 CM |
| FC2 | 200 | −12 | 17 CM |
| FC3 | 400 | +12 | 18 CM |
| FC4 | 600 | +16 | 24 CM |

From Table 1, it can be seen that there has been a shift in the resonant frequencies of each of the reference resonant circuits by virtue of their proximity to the RF disturbing elements within the target object 34. Included in this table is the percentage change in the resonant frequency from the undisturbed resonant frequency of each reference resonant circuit and the location of each reference resonant circuit on the tag 10 with reference to the left margin 14. More specifically, as an example, it can be seen that the spatial reference resonant circuit SC3 has an undisturbed resonant frequency of 504 KHz that the actual resonant frequency has shifted downward by 4% and that the resonant circuit is located 15 cm from the left margin 14 of the tag 10. Similarly, it can be seen that the frequency reference resonant circuit FC2 has an undisturbed resonant frequency of 200 KHz, that its actual resonant frequency has shifted downwardly be 12% and that it is located 17 cm from the left margin 14 of the tag 10.

After the actual resonant frequency of each reference resonant circuit is determined (in the form of a percentage shift corresponding to the difference in frequency between the undisturbed resonant frequency of each reference resonant circuit and the actual resonant frequency of each corresponding resonant circuit) the microprocessor then correlates the percentage of frequency shift for each spatial reference resonant circuit to its corresponding location on the tag 10 with reference to the left margin 14. In accordance with this preferred embodiment, this correlation is performed by constructing a piecewise linear function of frequency shift due to spatial effects versus the location of each spatial reference resonant circuit or cell on the tag 10 as illustrated in FIG. 3.

Figure 3:
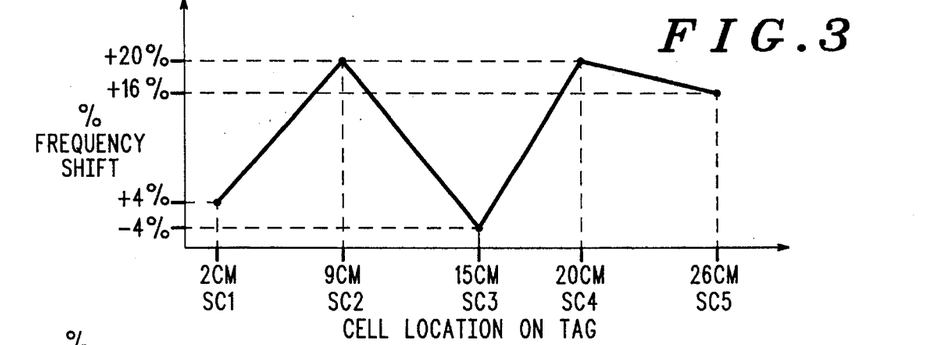
FIG. 3 is a graph illustrating the manner in which the system of FIG. 2 constructs a piecewise linear function correlating the difference between the actual resonant frequency and the undisturbed resonant frequency of each spatial reference resonant circuit on the tag of FIG. 1 to the location of each corresponding spatial reference resonant circuit on the tag of FIG. 1.
Figure 4:
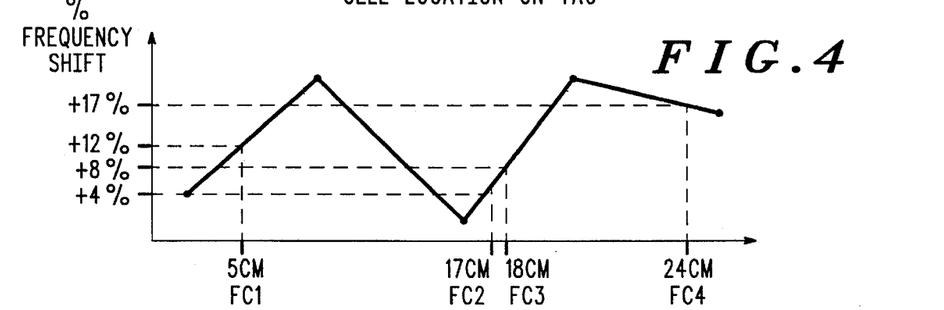
FIG. 4 is a graph illustrating the manner in which the system of FIG. 2 utilizes the graph of FIG. 3 to estimate the spatial shift component of the resonant frequency shift of each frequency reference resonant circuit on the tag of FIG. 1.

The microprocessor controller 22 then utilizes the correlation illustrated in FIG. 3 to estimate the resonant frequency spatial shift component for each of the frequency reference resonant circuits or cells. This estimation is performed by correlating the frequency shift of each of the spatial reference resonant circuits and its corresponding location on the tag to the location of each of the frequency reference resonant circuits or cells on the tag. In doing so, the microprocessor controller 22 utilizes the piecewise linear function of FIG. 3 as illustrated in FIG. 4. In FIG. 4, it will be noted that the estimated resonant frequency spatial shift component of frequency reference resonant circuit FC1 is +12%, the estimated resonant frequency spatial shift component of frequency reference resonant circuit FC2 is +4%, that the estimated resonant frequency spatial shift component of frequency reference resonant circuit FC3 is +8%, and that the estimated resonant frequency spatial shift component of frequency reference resonant circuit FC4 is +17%.

After the microprocessor controller 22 estimates the resonant frequency spatial shift component for each frequency reference resonant circuit, the microprocessor controller then subtracts the estimated resonant frequency spatial shift components for each frequency reference resonant circuit from the total determined resonant frequency shift of each frequency reference resonant circuit to estimate the shift in resonant frequency of the frequency reference resonant circuits due to frequency effects only. In doing so, the microprocessor controller 22 constructs a table containing the information illustrated below in Table 2.

| FREQUENCY REFERENCE CELL | FREQUENCY KHZ | A TOTAL MEASURED SHIFT (%) | LOCATION ON TAG (CM) | B ESTIMATED SPATIAL SHIFT (%) | A – B ESTIMATED SHIFT FROM FREQUENCY EFFECTS |
|---|---|---|---|---|---|
| FC1 | 75 | –16% | 5 | +12% | –28% |
| FC2 | 200 | –12% | 17 | +4% | –16% |
| FC3 | 400 | +12% | 18 | +8% | +4% |
| FC4 | 600 | +16% | 24 | +17% | –1% |

Utilizing the data contained in Table 2, the microprocessor controller 22 then correlates the resonant frequency shift components of each frequency reference resonant circuit to the undisturbed resonant frequencies of the frequency reference resonant circuits. In doing so, the microprocessor controller 22 preferably constructs a piecewise linear function of the frequency shift due to the frequency component versus the undisturbed resonant frequencies of the frequency reference resonant circuits as illustrated in FIG. 5.

As will be appreciated by those skilled in the art, more sophisticated curve-fitting methods may be utilized to generate the frequency shift models. Also, as the number of reference resonant circuits increase, more precise frequency shift models may be generated.

Figure 5:
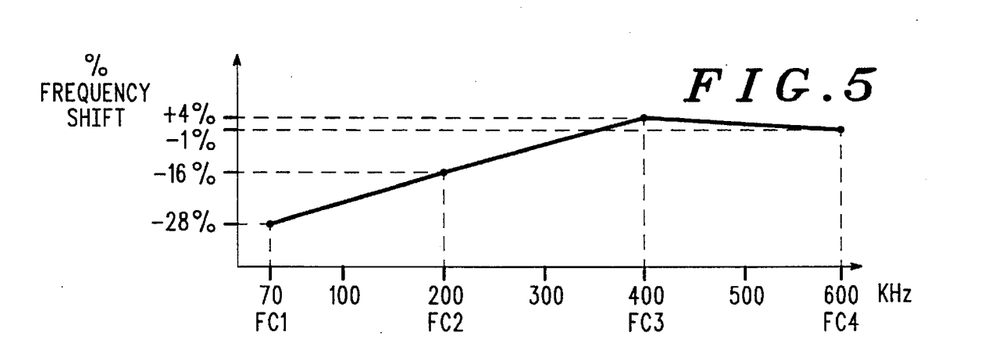
FIG. 5 is a graph illustrating the manner in which the system of FIG. 2 constructs a piecewise linear function correlating the frequency shift component of each frequency reference resonant circuit on the tag of FIG. 1 and the undisturbed resonant frequency of each corresponding frequency reference resonant circuit on the tag of FIG. 1.

After the microprocessor controller 22 constructs the spatial frequency shift model of FIG. 3 and the frequency shift model of FIG. 5, it then proceeds to generate compensation factors for each possible data resonant circuit for estimating the actual resonant frequency (estimated center frequency) for each data resonant circuit which might be located on the tag 10. In doing so, the microprocessor correlates the location of each data reference resonant circuit on the tag to the frequency shift due to spatial effects and the undisturbed resonant frequency of each data resonant circuit to the frequency shift due to the frequency effects. The microprocessor controller 22 then constructs a table including the data illustrated in Table 3 below.

Such addition of the spatial compensating factors to the frequency compensating factors is made possible because the spacial and frequency shift components or effects are mutually independent. The microprocessor controller 22 generates the compensation factors for the other data resonant circuits potentially residing on tag 10 in a similar manner as illustrated in Table 3.

The error in the estimated actual resonant frequencies of the data resonant circuits may be taken into account by relating the slope of the spatial and frequency shift models of FIGS. 3 and 5 respectively at the points corresponding to the location of each data resonant circuit and the undisturbed resonant frequency of each data resonant circuit. This error relates directly to the appropriate frequency range in which the dithered transmitters 26 should radiate their radio frequency energy and the corresponding frequency range in which the dithered receivers 28 should be swept through to detect the presence of the data resonant circuits. Although more sophisticated statistical methods may be employed to determine the optimal dither or frequency sweep range for detecting the presence of the data resonant circuits, in accordance with this preferred embodiment, a ±10% error band factor is employed.

Figure 6:
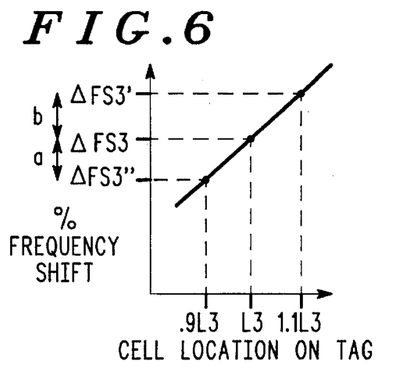
FIG. 6 is a graph illustrating the manner in which the system of FIG. 2 determines a radiation frequency range for the spatial dependent frequency shift component of one of the data resonant circuits on the tag of FIG. 1.

As an example, reference now may be had to FIG. 6 which is a graph illustrating the manner in which the system of FIG. 2 determines a radiation frequency range for the spatial dependent frequency shift component of data reso-

| DATA CELL | LOCATION CM | A ESTIMATED SPATIAL SHIFT (%) | UNDISTURBED FREQUENCY | B ESTIMATED FREQUENCY SHIFT | A + B ESTIMATED CENTER FREQUENCY |
|---|---|---|---|---|---|
| 1 | 3 | 6 | 150 | –20% | –14% |
| 2 | 7 | 16 | 175 | –18% | –2% |
| 3 | 20 | 20 | 225 | –12% | –8% |
| 4 | 4 | 8 | 350 | –2% | 6% |
| 5 | 18 | 8 | 480 | +2% | 10% |
| 6 | 13 | 7 | 500 | 0 | 7% |
| 7 | . | . | . | . | . |
| 8 | . | . | . | . | . |
| 9 | . | . | . | . | . |

In Table 3, it can be noted, for example, that the data resonant circuit DC3 is located 20 cm from the left margin 14 of tag 10 and therefore results in an estimated spatial shift in resonant frequency by 20%. Also, the undisturbed resonant frequency of data resonant circuit DC3 is 225 KHz to result in an estimated frequency shift due to frequency effects of –12%. The spatial compensating factor of +20% and the frequency compensation factor of –12% are then added together to result in an overall compensation factor of –8% shift in the resonant frequency of data resonant circuit DC3 from its undisturbed resonant frequency of 225 KHz.

nant circuit DC3. Here it will noted that the estimated spatial resonant frequency shift of data resonant circuit DC3 is ΔF3S. The portion of the spatial frequency shift model of FIG. 3 at the point L3 where data resonant circuit DC3 resides has a positive slope. If the location of this resonant circuit is increased by 10%, the spatial frequency shift error in the positive direction will be ΔF3S' and if the location of this cell were decreased 10%, the spatial frequency shift will be ΔF3S". The difference between ΔF3S' and ΔF3S is b and the difference between ΔF3S and ΔF3S" is a.

Figure 7:
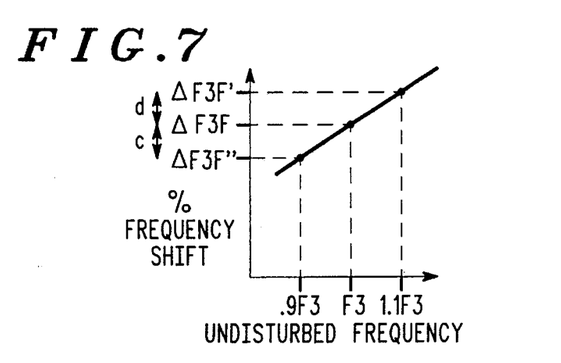
FIG. 7 is a graph illustrating the manner in which the system of FIG. 2 determines a radiation frequency range for the frequency dependent shift component of the same one data resonant circuit referred to in connection with FIG. 6.

Similarly, as will be noted in FIG. 7, the frequency shift range for the frequency effects is similarly determined using the portion of the frequency shift model of FIG. 5 which also has a positive slope. If the undisturbed resonant frequency of data resonant circuit DC3 is increased 10%, the estimated frequency shift component is ΔF3F' and if the undisturbed resonant frequency is decreased by 10%, the estimated frequency shift component is ΔF3F". The difference between ΔF3F' and the estimated actual resonant frequency of ΔF3F is d and the difference between the estimated actual resonant frequency ΔF3F and ΔF3F" is c. The microprocessor controller 22 estimates the error in the resonant frequency spatial shift component and the resonant frequency shift components for each data resonant circuit potentially residing on tag 10 in a similar manner.

Once the microprocessor controller 22 determines the potential error in the resonant frequency spatial shift component and the resonant frequency shift component for each potential data resonant circuit, the microprocessor then computes the frequency range which must be swept by each dithered transmitter 26 and dithered receiver 28 for each corresponding potential data resonant circuit. This is accomplished by calculating the low frequency of the range by using the formula indicated below.

Low Frequency of Dither=F3* (1+ΔF3F +ΔF3S −a −c)

The microprocessor controller 22 further calculates the upper frequency to be swept by the corresponding dithered transmitter 26 and dithered receiver 28 by using the formula indicated below.

High Frequency of Dither=F3*(1+ΔF3F +ΔF3S −b −d)

Once the dithered or frequency range of each appropriate dithered transmitter 26 and corresponding dithered receiver 28 is determined by the microprocessor controller 22, the microprocessor controller 22 provides suitable control signals to the appropriate dithered transmitters 26 and dithered receivers 28 to cause the respective frequency ranges for the corresponding potential data resonant circuits to be swept. As the frequency ranges are swept, the dithered receivers 28 and receive power detectors 30 determine the actual resonant frequencies of the data resonant circuits residing on the tag 10. When the actual resonant frequencies of the data resonant circuits are determined by the dithered transmitters 26, dithered receivers 28, and received power detectors 30, the microprocessor correlates the actual resonant frequencies detected to the estimated actual resonant frequencies. When there is a match, the microprocessor 22 then correlates this match to the undisturbed resonant frequencies of the potential data resonant circuits on the tag 10 to determine which data resonant circuits reside on the tag 10 for generating the specific tag code. As disclosed herein, the system 20 will determine that all six data resonant circuits DC1–DC6 reside on the tag 10 to generate the specific code for the tag 10.

Figure 8:
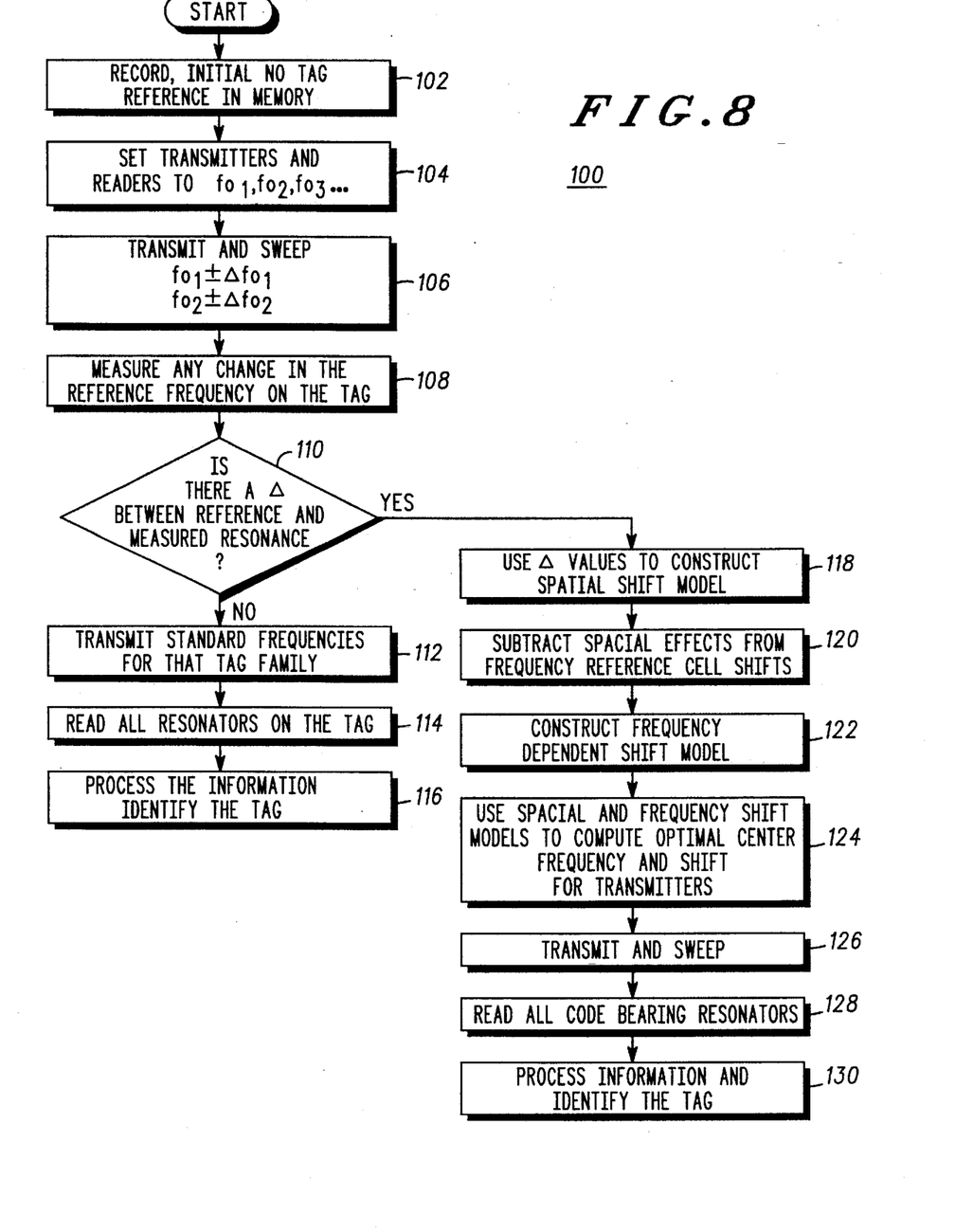
FIG. 8 is a first flow chart illustrating the manner in which the system of FIG. 2 may be implemented in accordance with a first embodiment of the present invention for providing resonant frequency shift compensation.

Referring now to FIG. 8, it is a flow chart 100 illustrating the overall operation of the system 20 in accordance with the first preferred embodiment of the present invention. The operation of the system 20 begins at step 102 wherein the memory 24 is provided with initial information, as previously described herein, which includes the undisturbed resonant frequency of each reference resonant circuit, the location of each reference resonant circuit, the undisturbed resonant frequency of each data resonant circuit which may reside on the tag 10 and the location of each data resonant circuit which may reside on the tag 10. Thereafter, in accordance with step 104, the microprocessor controller 22 sets the appropriate dithered transmitters 26 and dithered receivers 28 corresponding to each reference resonant circuit to the corresponding undisturbed resonant frequency of each reference resonant circuit. Then, in accordance with step 106, the dithered transmitters 26 and dithered receivers 28 corresponding to each reference resonant circuit are caused to transmit and receive respectively over a frequency range about each center frequency set in step 104. Then, in accordance with step 108, the difference between the undisturbed resonant frequencies of the reference resonant circuits and the actual resonant frequencies of the reference resonant circuits is measured.

The operation of the system 10 then reaches a decision point 110. The microprocessor controller 22 in accordance with step 110 determines if there is a difference between the undisturbed resonant frequencies of the reference resonant circuits and the determined actual resonant frequencies of the reference resonant circuits. If the answer in step 110 is no, the system 20 then proceeds to step 112 wherein the dithered transmitters 26 and dithered receivers 28 corresponding to the data resonant circuits potentially residing on tag 10 are activated for transmitting and receiving respectively at the undisturbed resonant frequencies of the data resonant circuits. The system 20 then, in accordance with step 114, and preferably from the energy absorbed by each data resonant circuit residing on tag 10, determines the resonant frequencies detected by the dithered receivers 28 and the received power detectors 30. Lastly, in accordance with step 116, the microprocessor controller 22, from the resonant frequencies determined by the dithered receivers 28 and received power detectors 30, determines which resonant circuits reside on tag 10 and thereafter generates the specific code for tag 10.

If, during the decision point 110, it is determined by the microprocessor controller 22 that there is a frequency difference between the undisturbed resonant frequencies of the reference resonant circuits and the actual resonant frequencies of the reference resonant circuits, the system proceeds to step 118. In accordance with step 118, the microprocessor controller 22 uses the frequency difference values (the difference in frequency between the undisturbed resonant frequencies and the actual resonant frequencies) to construct the spatial shift model as illustrated, for example, in FIG. 3. Thereafter, in accordance with step 120, the microprocessor controller 22 subtracts the spatial effects from the frequency reference resonant cell frequency shifts to construct the frequency dependent shift model in accordance with step 122 and as illustrated, for example, in FIG. 5.

After completing step 122, the microprocessor controller 22 then, in accordance with step 124, uses the spatial and frequency shift models to compute the estimated actual resonant frequencies of the data resonant circuits and the sweep range for the dithered transmitters 26 and dithered receivers 28 as previously described. Thereafter, in accordance with step 126, the dithered transmitters and receivers are activated and in accordance with step 128 the actual resonant frequencies of those data resonant circuits residing on tag 10 are determined. Lastly, in step 130, the microprocessor controller processes the resulting information by matching the estimated actual resonant frequencies to the actual resonant frequencies detected and using each match to correlate to a corresponding undisturbed resonant frequency to finally determine which data resonant circuits reside on the tag 10 for generating the specific code for the tag 10.

Figure 9:
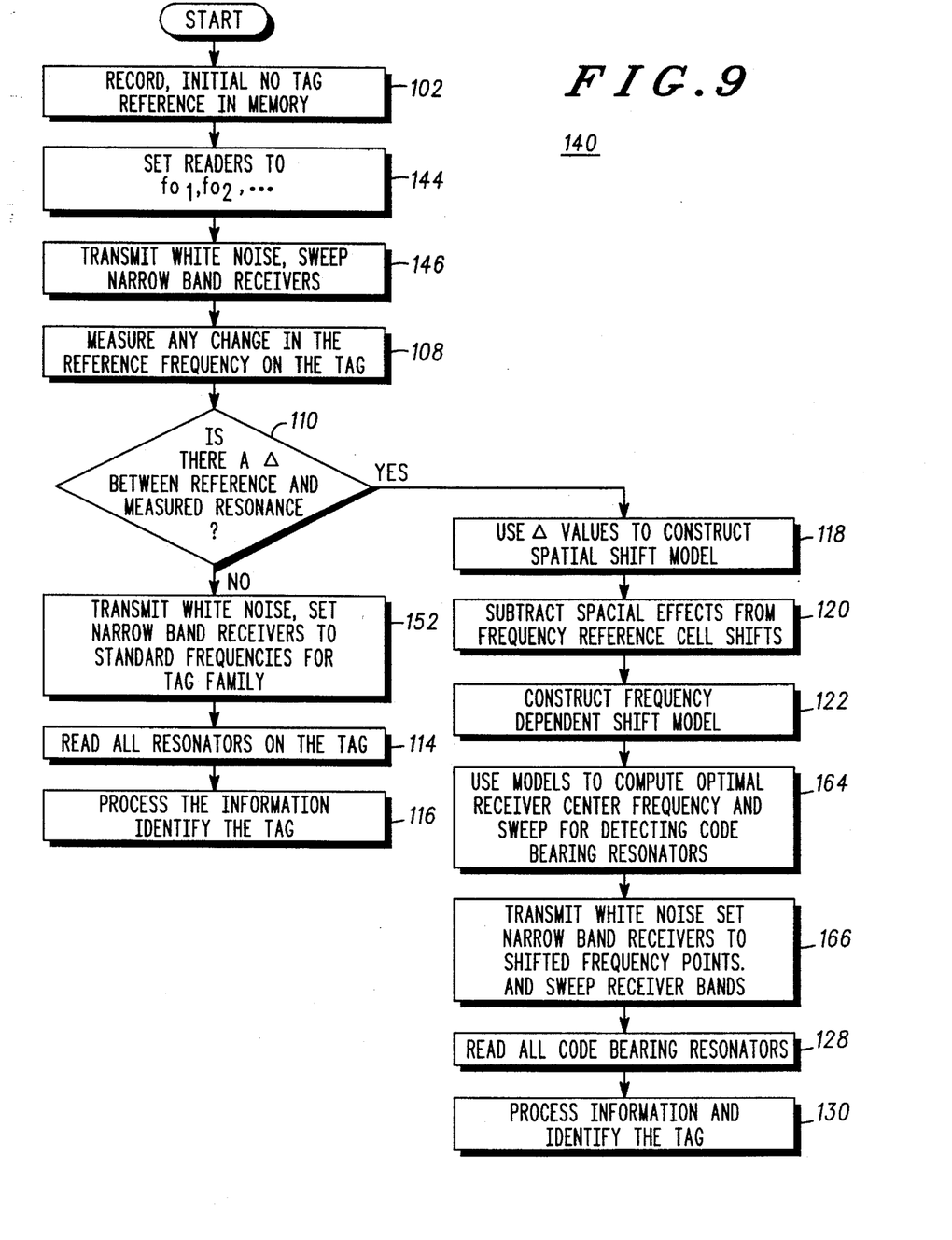
FIG. 9 is a second flow chart illustrating the manner in which the system of FIG. 2 may be implemented in accordance with a second embodiment of the present invention for providing resonant frequency shift compensation.

Referring now to FIG. 9, it is a flow diagram 140 illustrating the overall operation of the system 20 in accordance with a second preferred embodiment of the present invention. The flow chart 140 is similar to the flow chart of FIG. 8 and to the extent that flow chart 140 includes identical operational steps as flow chart 100 identical reference characters are carried throughout FIG. 9.

The system operation contemplated by the flow chart 140 utilizes, instead of dithered transmitters for radiating the reference resonant circuits and data resonant circuits, a wide band transmitter capable of transmitting white noise across the entire collective frequency span of the data resonant circuits. As a result, in accordance with step 144, only the dithered receivers 28 are set to the undisturbed resonant frequencies of the reference resonant circuits. In step 146, the transmitter transmits white noise while the dithered receivers sweep a frequency range above and below the undisturbed resonant frequencies of the reference resonant circuits for determining the frequency of maximum absorption. The operation depicted in flow chart 140 remains the same until step 152 wherein white noise is transmitted after determining that there is no difference between the actual resonant frequencies of the reference resonant circuits and the undisturbed resonant frequencies of the reference resonant circuits. Steps 114 and 116 remain the same as in the flow chart 100.

The spatial shift model and the frequency dependent shift model are both generated in accordance with step 118, 120, and 122 as previously described with respect to the flow chart 100 of FIG. 8. In step 164, the spatial shift model and the frequency dependent shift model are used to compute the estimated actual resonant frequency and the sweep range for each data resonant circuit potentially residing on tag 10 which are utilized for setting the dithered receivers 28. Since a wide band white noise transmitter is utilized in accordance with this preferred embodiment, a center frequency and sweep range need not be established for the transmitter.

In accordance with step 166, the transmitter is caused to transmit the white noise and the dithered receivers are set to detect the resonant frequencies of the data resonant circuits residing on tag 10. Thereafter, the actual resonant frequencies are determined in accordance with step 128 and the final specific identification code for tag 10 is determined in accordance with step 130 as previously described.

While particular embodiments of the present invention have been shown and described, modifications may be made without departing from the present invention. For example, while one dimensional spatial shift and frequency shift effect models are disclosed herein, the present invention, as will be appreciated by those skilled in the art, is equally applicable to and adapted for two dimensional or three dimensional spatial shift and frequency shift model construction. As a result, the reference resonant circuits and data resonant circuits may be randomly distributed on the RF tag, so long as the corresponding locations of each is predetermined and known. In addition, as will be appreciated by those skilled in the art, if it is found that there are no frequency shifts due to spatial effects, only a frequency shift model need be constructed. In this case, it would not be necessary to know or have predetermined the locations of the frequency reference resonant circuits nor the locations of the data resonant circuits. Conversely, if it is found that there are no frequency shifts due to frequency effects, it is only necessary to create a spatial frequency shift model. Obviously, in this case, frequency reference resonant circuits would not be required. Accordingly, both near and far field detection of the resonant frequencies of the resonant circuits on the RF tag are contemplated herein. The present invention has aspects applicable to manufacturing variation compensation and compensation for other disturbances such as temperature, mechanical deformation or other objects, besides the tagged object, which alter a designed resonant mode on a tag. As a result, it is intended in the appended claims to cover all such changes and modifications which fall within the true spirit and scope of the invention.

We claim:

1. A RF tagging system comprising:

a tag having thereon a plurality of reference resonant circuits and a plurality of data resonant circuits, each of said data resonant circuits being resonant at a different actual resonant frequency corresponding to an undisturbed resonant frequency selected from a predetermined plurality of known resonant frequencies and each said reference resonant circuit being resonant at an actual different resonant frequency corresponding to a predetermined known undisturbed different resonant frequency;

determining means for determining the actual resonant frequencies of each said reference resonant circuit; and compensating means for determining for each said reference resonant circuit the frequency difference between its actual resonant frequency and its corresponding predetermined known undisturbed resonant frequency and responsive thereto providing a compensation factor for the resonant frequency of each said data resonant circuit, said determining means determining the actual resonant frequency of each said data resonant circuit, and said compensating means being responsive to said compensation factors and the actual resonant frequencies of said data resonant circuits for determining the undisturbed resonant frequencies of said data resonant circuits.

2. A system as defined in claim 1 wherein said determining means are responsive to said compensation factors for determining the actual resonant frequency of each said data resonant circuit.

3. A system as defined in claim 1 wherein said compensating means correlates said frequency differences and the predetermined undisturbed resonant frequencies of said reference resonant circuits to the predetermined undisturbed resonant frequencies of said data resonant circuits for providing said compensation factors.

4. A system as defined in claim 3 wherein the undisturbed resonant frequencies of said reference resonant circuits span the undisturbed resonant frequencies of said data resonant circuits, whereby said compensation factors are frequency dependent.

5. A system as defined in claim 4 wherein said data and reference resonant circuits are passive resonant circuits and wherein said determining means include transmitter means for radiating radio frequency energy in a frequency range including the undisturbed resonant frequencies of said data and reference resonant circuits.

6. A system as defined in claim 5 wherein said determining means further includes receiving means for receiving radio frequency energy in said frequency range.

7. A system as defined in claim 6 wherein said receiving means determines the actual resonant frequencies of said resonant circuits by detecting absorption of said radiated radio frequency energy by said resonant circuits.

8. A system as defined in claim 5 wherein said transmitter means are responsive to said compensating factors for radiating radio frequency energy at transmission frequencies corresponding to each of said actual resonant frequencies of said data resonant circuits.

9. A system as defined in claim 8 wherein said transmitter means are dithered transmission means for sweeping frequency ranges above and below each said actual resonant frequency of said data resonant circuits.

10. A system as defined in claim 9 wherein said determining means further include dithered receiving means responsive to said compensation factors for receiving radiated radio frequency energy in said frequency ranges.

11. A system as defined in claim 1 wherein each of said reference resonant circuit is located at a different predetermined known location on said tag, wherein each said data resonant circuit is located at a different predetermined known location on said tag and wherein said compensating means correlates said frequency differences and the location of said reference resonant circuits on said tag to the locations of said data resonant circuits on said tag for providing said compensation factors.

12. A system as defined in claim 11 wherein the undisturbed resonant frequencies of said reference resonant circuits are closely spaced together, whereby said compensation factors are spatially dependent.

13. A system as defined in claim 12 wherein said data and reference resonant circuits are passive resonant circuits and wherein said determining means include transmitter means for radiating radio frequency energy in a frequency range including the undisturbed resonant frequencies of said data and reference resonant circuits.

14. A system as defined in claim 13 wherein said determining means further includes receiving means for receiving radio frequency energy in said frequency range.

15. A system as defined in claim 14 wherein said receiving means determines the actual resonant frequencies of said resonant circuits by detecting absorption of said radiated radio frequency energy by said resonant circuits.

16. A system as defined in claim 13 wherein said transmitter means are responsive to said compensating factors for radiating radio frequency energy at transmission frequencies corresponding to each of said actual resonant frequencies of said data resonant circuits.

17. A system as defined in claim 16 wherein said transmitter means are dithered transmission means for sweeping frequency ranges above and below each said actual resonant frequency of said data resonant circuits.

18. A system as defined in claim 17 wherein said determining means further include dithered receiving means responsive to said compensation factors for receiving radiated radio frequency energy in said frequency ranges.

19. A RF tagging system comprising:

a tag having thereon a plurality of first reference resonant circuits, a plurality of second reference resonant circuits, and a plurality of data resonant circuits, each said data resonant circuit being resonant at a different actual resonant frequency corresponding to an undisturbed resonant frequency selected from a predetermined plurality of known resonant frequencies and being located at a predetermined known location on said tag, each said first reference resonant circuit being resonant at an actual different resonant frequency corresponding to a predetermined known undisturbed different resonant frequency and being located at a predetermined known location on said tag, and each said second reference resonant circuit being resonant at an actual different resonant frequency corresponding to a predetermined known undisturbed different resonant frequency and being located at a predetermined known location on said tag;

determining means for determining the actual resonant frequency of each said reference resonant circuits;

compensating means for determining, for each said first reference resonant circuit the frequency difference between its actual resonant frequency and its corresponding predetermined known undisturbed resonant frequency, for determining, for each said second reference resonant circuit the frequency difference between its actual resonant frequency and its corresponding predetermined known undisturbed resonant frequency, and being responsive to said determined frequency differences for providing a compensation factor for the resonant frequency of each said data resonant circuit;

said determining means determining the actual resonant frequency of each said data resonant circuit, and said compensating means being responsive to said compensation factors and the actual resonant frequencies of said data resonant circuits for determining the undisturbed resonant frequencies of said data resonant circuits.

20. A system as defined in claim 19 wherein said determining means are responsive to said compensation factors for determining the actual resonant frequency of each said data resonant circuit.

21. A system as defined in claim 19 wherein said compensating means correlates said frequency differences associated with said first reference resonant circuits and the location of said first reference resonant circuits on said tag to the locations of said data resonant circuits on said tag for providing a spatially dependent compensation factor for each said data resonant circuit.

22. A system as defined in claim 21 wherein the undisturbed resonant frequencies of said first resonant circuits are closely spaced together.

23. A system as defined in claim 21 wherein said compensating means further correlates said frequency differences associated with said first reference resonant circuits and the location of said first reference resonant circuits on said tag to the location of each said second resonant circuit on said tag for estimating a spatially dependent shift component of each said frequency difference associated with each said second reference resonant circuit.

24. A system as defined in claim 23 wherein the undisturbed resonant frequencies of said second reference resonant circuits span the undisturbed resonant frequencies of said data resonant circuits.

25. A system as defined in claim 23 wherein said compensating means subtracts each said estimated spatial shift component from the corresponding frequency difference associated with each said second reference resonant circuit for providing a frequency dependent frequency difference for each said second reference resonant circuit.

26. A system as defined in claim 25 wherein said compensating means further correlates said frequency dependent frequency differences and the predetermined undisturbed resonant frequencies of said second reference resonant circuits to the predetermined undisturbed resonant frequencies of said data resonant circuits for providing a frequency dependent compensation factor for each said data resonant circuit.

27. A system as defined in claim 26 wherein said compensating means combines each said spatially dependent compensation factor with each corresponding said frequency dependent compensation factor corresponding to each said data resonant circuit to provide said compensation factor for the resonant frequency of each said data resonant circuit.

28. A system as defined in claim 27 wherein said data and reference resonant circuits are passive resonant circuits and wherein said determining means includes transmitter means for radiating radio frequency energy in a frequency range including the undisturbed resonant frequencies of said data and reference resonant circuits.

29. A system as defined in claim 28 wherein said determining means further includes receiving means for receiving radio frequency energy in said frequency range.

30. A system as defined in claim 29 wherein said receiving means determines the actual resonant frequencies of said resonant circuits by detecting absorption of said radiated radio frequency energy by said resonant circuits.

31. A system as defined in claim 28 wherein said transmitter means are responsive to said compensation factors for radiating radio frequency energy at transmission frequencies corresponding to each of said actual resonant frequencies of said data resonant circuits.

32. A system as defined in claim 31 wherein said transmitter means are dithered transmission means for sweeping frequency ranges above and below each said actual resonant frequency of said data resonant circuits.

33. A system as defined in claim 32 wherein said determining means further include dithered receiving means responsive to said compensation factors for receiving radiated radio frequency energy in said frequency ranges.

34. A RF tagging system comprising:

a tag having thereon a plurality of reference resonant means and a plurality of data resonant means, each of said data resonant means being resonant at a different actual resonant frequency corresponding to an undisturbed resonant frequency selected from a predetermined plurality of known resonant frequencies and each said reference resonant means being resonant at an actual different resonant frequency corresponding to a predetermined known undisturbed different resonant frequency;

determining means for determining the actual resonant frequencies of each said reference resonant means; and compensating means for determining for each said reference resonant means the frequency difference between its actual resonant frequency and its corresponding predetermined known undisturbed resonant frequency and responsive thereto providing a compensation factor for the resonant frequency of each said data resonant means, said determining means determining the actual resonant frequency of each said data resonant means, and said compensating means being responsive to said compensation factors and the actual resonant frequencies of said data resonant means for determining the undisturbed resonant frequencies of said data resonant means.

35. A tagging system comprising:

a tag having thereon at least one reference resonant means and at least one data resonant means, each of said data resonant means being resonant at at least a different actual resonant frequency corresponding to an a designed resonant frequency selected from a predetermined plurality of known resonant frequencies and each said reference resonant means being resonant at at least an actual different resonant frequency corresponding to a predetermined known designed different resonant frequency;

determining means for determining the actual resonant frequencies of each said reference resonant means; and compensating means for determining for each said reference resonant means the frequency difference between its actual resonant frequency and its corresponding predetermined known designed resonant frequency and responsive thereto providing a compensation factor for the resonant frequency of each said data resonant means, said determining means determining the actual resonant frequency of each said data resonant means, and said compensating means being responsive to said compensation factors and the actual resonant frequencies of said data resonant means for determining the designed resonant frequencies of said data resonant means.

36. A RF tagging system according to claim 35 wherein said tag has a plurality of said reference resonant means.

37. A tagging system comprising:

a tag having thereon a plurality of reference resonant modes and a plurality of data resonant modes, each of said data resonant modes being resonant at a different actual resonant frequency corresponding to an undisturbed resonant frequency selected from a predetermined plurality of known resonant frequencies and each said reference resonant modes being resonant at an actual different resonant frequency corresponding to a predetermined known undisturbed different resonant frequency;

determining means for determining the actual resonant frequencies of each said reference resonant modes; and compensating means for determining for each said reference resonant modes the frequency difference between its actual resonant frequency and its corresponding predetermined known undisturbed resonant frequency and responsive thereto providing a compensation factor for the resonant frequency of each said data resonant modes, said determining means determining the actual resonant frequency of each said data resonant modes, and said compensating means being responsive to said compensation factors and the actual resonant frequencies of said data resonant modes for determining the undisturbed resonant frequencies of said data resonant modes.

38. A RF tagging system comprising:

a tag having thereon a plurality of reference resonant modes and a plurality of data resonant modes, each of said data resonant modes being resonant at a different actual resonant frequency corresponding to an a designed resonant frequency selected from a predetermined plurality of known resonant frequencies and each said reference resonant modes being resonant at an actual different resonant frequency corresponding to a predetermined known designed different resonant frequency;

determining means for determining the actual resonant frequencies of each said reference resonant modes; and compensating means for determining for each said reference resonant modes the frequency difference between its actual resonant frequency and its corresponding predetermined known designed resonant frequency and responsive thereto providing a compensation factor for the resonant frequency of each said data resonant modes, said determining means determining the actual resonant frequency of each said data resonant modes, and said compensating means being responsive to said compensation factors and the actual resonant frequencies of said data resonant modes for determining the designed resonant frequencies of said data resonant modes.

* * * * *

UNITED STATES PATENT AND TRADEMARK OFFICE
CERTIFICATE OF CORRECTION

PATENT NO. : 5,473,330
DATED : December 5, 1995
INVENTOR(S) : Lauro et al.

It is certified that error appears in the above-identified patent and that said Letters Patent is hereby corrected as shown below:

On the title page: Item [63] and Column 1, line 3, please insert --This is a continuation-in-part of application Serial No. 08/011,585, filed February 1, 1993.

Signed and Sealed this

Ninth Day of July, 1996

Attest:

BRUCE LEHMAN

*Attesting Officer*        *Commissioner of Patents and Trademarks*